United States Patent
Kollmer

(10) Patent No.: US 9,835,712 B2
(45) Date of Patent: Dec. 5, 2017

(54) VEHICLE RADAR DIAGNOSTIC ARRANGEMENT

(71) Applicant: Norbert Kollmer, Ismaning (DE)

(72) Inventor: Norbert Kollmer, Vårgårda (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 281 days.

(21) Appl. No.: 14/653,349

(22) PCT Filed: Dec. 21, 2012

(86) PCT No.: PCT/SE2012/051491
§ 371 (c)(1),
(2) Date: Jun. 18, 2015

(87) PCT Pub. No.: WO2014/098693
PCT Pub. Date: Jun. 26, 2014

(65) Prior Publication Data
US 2015/0346323 A1 Dec. 3, 2015

(51) Int. Cl.
*G01S 7/40* (2006.01)
*G01S 7/02* (2006.01)
*G01S 13/02* (2006.01)
*G01S 13/93* (2006.01)
(Continued)

(52) U.S. Cl.
CPC ............. *G01S 7/02* (2013.01); *G01S 7/352* (2013.01); *G01S 7/4004* (2013.01); *G01S 7/4021* (2013.01); *G01S 13/02* (2013.01); *G01S 13/34* (2013.01); *G01S 13/931* (2013.01); *G01S 2007/356* (2013.01)

(58) Field of Classification Search
CPC .................................. G01S 7/02; G01S 7/352
USPC ............................................. 342/70–72, 165
See application file for complete search history.

(56) References Cited

U.S. PATENT DOCUMENTS 5,594,413 A * 1/1997 Cho .......................... G01S 15/89
180/169
5,717,399 A * 2/1998 Urabe .................... G01S 13/931
342/70
(Continued)

FOREIGN PATENT DOCUMENTS

EP  1 760 488 A1  7/2007
EP  1 925 948 A1  5/2008

OTHER PUBLICATIONS

PCT International Search Report—dated Oct. 16, 2013.

*Primary Examiner* — Marcus E Windrich
(74) *Attorney, Agent, or Firm* — Brinks Gilson & Lione

(57) ABSTRACT

A vehicle radar system (3, 3', 3") and method which including a microcontroller unit (21), MCU, and a plurality of Analog to Digital Converters (9, 10, 11, 12), (ADCs), arranged to convert the received signals to a digital form and to transfer the converted digital signals to a first and second Digital Signal Processor (DSP) (18, 19), DSP. The MCU (21) is arranged to control the DSPs (18, 19) such that for one time frame (n), the first DSP (18) functions as a Master DSP and the second DSP (19) functions as a Slave DSP, and such that for the next time frame (n+1), the first DSP (18) is configured to function as a Slave DSP and the second DSP (19) functions as a Master DSP. The MCU compares the raw target data from the first and second DSPs (19) to determine a degree of functionality for the DSPs (18, 19).

7 Claims, 5 Drawing Sheets

(51) Int. Cl.
  *G01S 7/35*   (2006.01)
  *G01S 13/34*  (2006.01)

(56) References Cited

U.S. PATENT DOCUMENTS

| | | | | |
|---|---|---|---|---|
| 6,335,700 B1 * | 1/2002 | Ashihara | ............... | G01S 7/4004 342/117 |
| 6,559,792 B1 * | 5/2003 | Douglas | ................ | G01S 7/4017 342/165 |
| 6,622,118 B1 * | 9/2003 | Crooks | .................. | G01S 7/292 342/173 |
| 6,831,595 B2 * | 12/2004 | Isaji | ...................... | G01S 7/4004 342/104 |
| 7,508,337 B2 * | 3/2009 | Morinaga | ............... | G01S 7/352 342/109 |
| 7,538,714 B2 * | 5/2009 | Nishijima | ............. | G01S 7/4004 342/128 |
| 2006/0156076 A1 * | 7/2006 | Mayer | ................... | G01S 7/4004 714/55 |
| 2007/0052581 A1 * | 3/2007 | Shima | .................. | G01S 7/4021 342/173 |

\* cited by examiner

VEHICLE RADAR DIAGNOSTIC ARRANGEMENT

CROSS REFERENCE TO RELATED APPLICATIONS

This application claims priority to PCT International Patent Application No. PCT/SE2012/051491, filed on Dec. 21, 2012.

FIELD OF THE INVENTION

The present invention relates to a vehicle radar system having a radar front end which in turn includes transmitting means arranged for generating and transmitting sweep signals, and also receiving means arranged for receiving reflected signals. The vehicle radar system further includes a plurality of Analog to Digital Converters, ADC:s, which are arranged to convert the received signals to a digital form and to transfer the converted digital signals to a first Digital Signal Processor, DSP, and a second DSP. The vehicle radar system further includes a microcontroller unit, MCU.

The present invention also relates to a method for monitoring functional parameters of a vehicle radar system, the method including the step of sending radar signals and receiving reflected radar signals during certain time frames. The received radar signals are fed to a first Digital Signal Processor, DSP, and a second DSP via a plurality of Analog to Digital Converters, ADC:s.

BACKGROUND

Today, one or more radar systems are often used in vehicles in order to detect obstacles in the surroundings. Such a radar system is arranged to distinguish or resolve single targets from the surroundings by using a Doppler effect in a previously well-known manner. Preferably, such a radar system is arranged to provide resolution in all three dimensions by performing two-dimensional Fast Fourier Transform (FFT) processing, which provides range and Doppler resolution as well as Digital Beam Forming, providing a desired angular resolution. By adapting a radar system's radio frequency (RF) sweep, the number of antenna sub-arrays that are combined and the number of RF sweeps that are processed, it is possible to adapt the performance of the radar system to multiple requirements and applications.

A radar system typically includes a radar front end which in turn has means for generating a sweep signal and forming "chirp" signals that are transmitted, reflected and received by means of appropriate antennas provided in the radar system. The received signals, thus constituted by reflected radar echoes, are amplified and may be transferred in 16 similar channels to Analog Digital Converters (ADC:s); four channels for each ADC. The ADC:s are arranged to convert the received analog signals to digital signals which are transferred with four serial buses to two Digital Signal Processors, DSP:s.

All FFT processing and preliminary target identification are conducted in the two DSP:s, performing the FFT in parallel on all channels.

To prepare a raw target list, a first DSP, or Slave DSP, transfer preprocessed FFT data to a second DSP, or Master DSP, via for example Ethernet. The Master DSP then calculates and sends the raw target list to a Microcontroller Unit (MCU).

The MCU is arranged to perform an application that performs target identification and tracking. Additionally, other applications such as for example communications and system diagnostics are also performed in the MCU.

As evident from the above, there are a lot of components in a radar system according to the above, and there are thus many sources of error and malfunction.

When vehicle radar systems are concerned, there is a demand for a high level of performance; error and malfunction in such a radar system could lead to a falsified target list which in turn could lead to undesireable situations for the car driver. Today, the needed diagnostic coverage for such a radar system is normally not implemented due to system resources, costs and complexity, since additional monitoring hardware is needed.

There is thus a need for a vehicle radar system which is arranged for performing sufficient self-diagnostic procedures in a less complicated and more cost-effective manner than prior art vehicle radar systems, where such diagnostics have been present at all.

SUMMARY AND INTRODUCTORY DESCRIPTION

The above described object is achieved by this invention by providing a vehicle radar system having a radar front end which in turn includes transmitting means arranged for generating and transmitting sweep signals, and also receiving means arranged for receiving reflected signals. The vehicle radar system further includes a plurality of Analog to Digital Converters, ADC:s, which are arranged to convert the received signals to a digital form and to transfer the converted digital signals to a first Digital Signal Processor, DSP, and a second DSP. The vehicle radar system further includes a microcontroller unit, MCU which is arranged to control the DSP:s such that for one time frame, the first DSP is configured to function as a Master DSP and the second DSP is configured to function as a Slave DSP, and such that for the next time frame, the first DSP is configured to function as a Slave DSP and the second DSP is configured to function as a Master DSP. For a each time frame, the Slave DSP is arranged to pre-process Fast Fourier Transform, FFT, data and to transfer the pre-processed FFT data to the Master DSP. The Master DSP is arranged to perform raw target calculations by means of the received pre-processed FFT data. The MCU is further arranged to compare the raw target data from the first DSP and from the second DSP and to, based on such comparisons, determine a degree of functionality for the DSP:s.

The above described object is also achieved by means of a method for monitoring functional parameters of a vehicle radar system, the method including the step of sending radar signals and receiving reflected radar signals during certain time frames. The received radar signals are fed to a first Digital Signal Processor, DSP, and a second DSP via a plurality of Analog to Digital Converters, ADC:s. The method further includes the step of controlling the DSP:s such that for one time frame, the first DSP is configured to be used as a Master DSP and the second DSP is configured to be used as a Slave DSP, and such that for the next time frame the first DSP is configured to be used as a Slave DSP and the second DSP is configured to be used as a Master DSP. For a each time frame, the Slave DSP is used for pre-processing Fast Fourier Transform, FFT, data which is transferred to the Master DSP, which Master DSP is used for performing raw target calculation using the received pre-processed FFT data. The method also includes the step of comparing the raw target data from the first DSP and from the second DSP for determining a degree of functionality for the DSP:s.

According to an example of the invention, the ADC:s connected to the first DSP are also connected to a corresponding first set of radar front end ports, and the ADC:s connected to the second DSP are also connected to corresponding switches of the vehicle radar system. The switches are switchable between a first switch state and a second switch state. At the first switch state, the ADC:s connected to the second DSP are also connected to the first set of radar front end ports via the switches. At the second switch state, the ADC:s connected to the second DSP are also connected to a second set of corresponding radar front end ports via the switches.

According to another example of the invention, the ADC:s are connected to a corresponding switch of the vehicle radar system, the switches being switchable between a first switch state and a second switch state. At the first switch state, the ADC:s connected to the second DSP are also connected to a corresponding first set of radar front end ports via corresponding switches, and the ADC:s connected to the first DSP are also connected to a corresponding second set of radar front end ports via corresponding switches. At the second switch state, the ADC:s connected to the second DSP are also connected to the second set of radar front end ports via the corresponding switches, and the ADC:s connected to the first DSP are also connected to the first set of radar front end ports via the corresponding switches.

Other examples are disclosed herein.

A number of advantages are obtained by means of the present invention. Mainly, vehicle radar system is disclosed which is arranged for performing uncomplicated and sufficient self-diagnostic procedures.

BRIEF DESCRIPTION OF THE DRAWINGS

The present invention will now be described more in detail with reference to the appended drawings, where.

DETAILED DESCRIPTION

Figure 1:
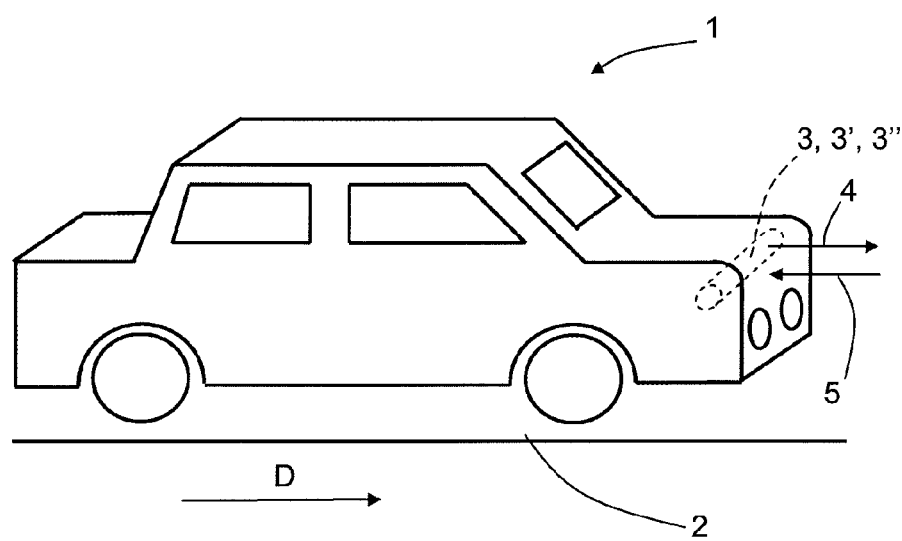
FIG. 1 shows a schematic side view of a vehicle.

FIG. 1 schematically shows a side view a vehicle 1 arranged to run on a road 2 in a direction D, where the vehicle 1 including a vehicle radar system 3 which is arranged to distinguish and/or resolve single targets from the surroundings by using a Doppler effect in a previously well-known manner. The vehicle radar system 3 is arranged to provide resolution in all three dimensions by performing two-dimensional Fast Fourier Transform (FFT) processing.

Figure 2:
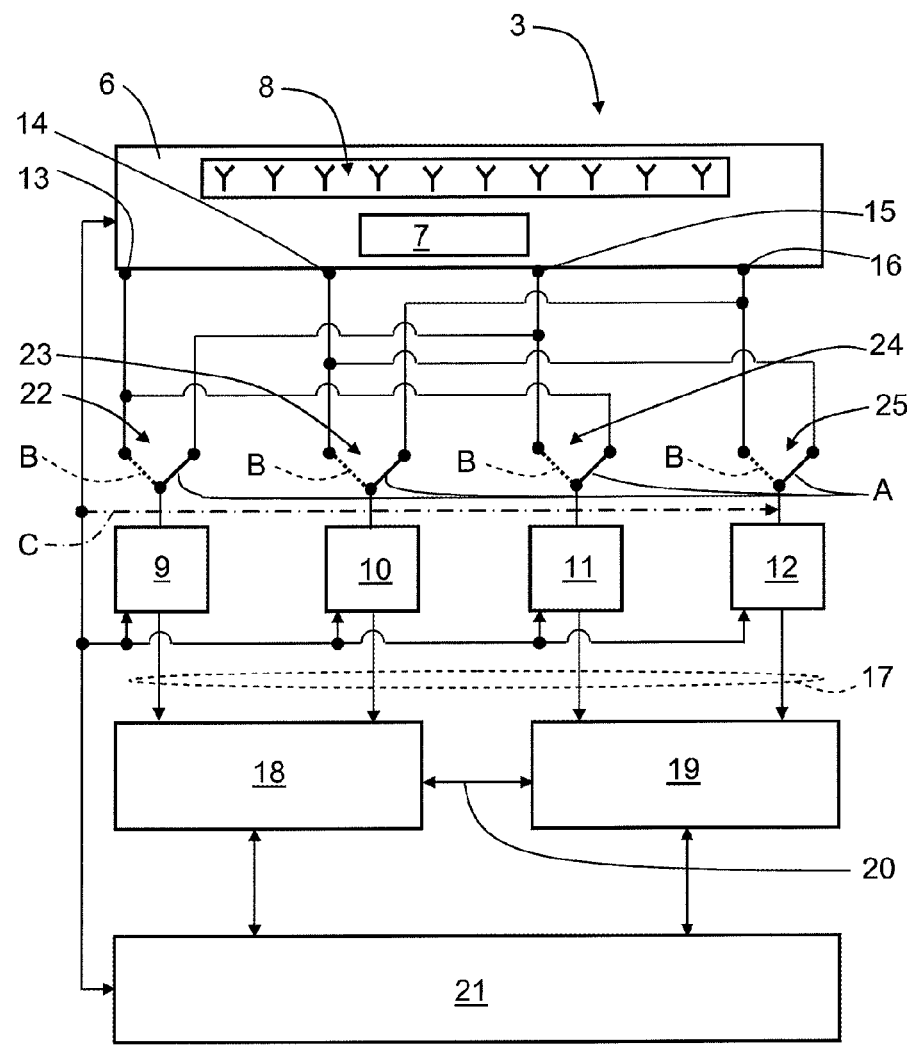
FIG. 2 shows a simplified schematic of a vehicle radar system according to a first example of the invention.

With reference to both FIG. 1 and FIG. 2, FIG. 2 showing a simplified schematic of a vehicle radar system 3 according to a first example, the vehicle radar system 3 including a radar front end 6 which in turn including transmitting means 7a for generating and transmitting sweep signals via appropriate antennas 8 comprised in the radar front end 6. The transmitted signals 4 are reflected, the radar front end 6 comprising receiving means 7b for receiving the reflected signals 5 via the antennas 8, or other antennas in the radar front end 6. The received signals 5, thus constituted by reflected radar echoes, are amplified in the receiving means 7b and transferred in sixteen parallel channels, channel 101-116, to four Analog to Digital Converters 9, 10, 11, 12 (ADC:s); four channels for each ADC. Each set of four channels is transferred from a corresponding radar front end port 13, 14, 15, 16.

The ADC:s 9, 10, 11, 12 are arranged to convert the received analog signals to digital signals which are transferred via four serial buses 17 to two Digital Signal Processors 18, 19, DSP:s. A first ADC 9 and a second ADC 10 are connected to a first DSP 18, while a third ADC 11 and a fourth ADC 12 are connected to a second DSP 19.

All FFT processing and preliminary target identification are conducted in the two DSP:s 18, 19, performing the FFT in parallel on all channels.

To prepare a raw target list, the first DSP 18, or Slave DSP, transfer pre-processed FFT data to the second DSP 19, or Master DSP, via a DSP connection 20 such as for example an Ethernet connection. The Master DSP 19 then calculates and sends the raw target list to a Microcontroller Unit 21 (MCU).

The MCU 21 is arranged to perform an application that including target identification and tracking. Additionally, other applications such as for example communications and system diagnostics are also performed in the MCU 21. As shown in FIG. 2, the MCU 21 is connected to the DSP:s 18, 19, the ADC:s 9, 10, 11, 12 and the radar front end 6.

According to the present invention, each ADC 9, 10, 11, 12 is connected to a switch 22, 23, 24, 25, each switch 22, 23, 24, 25 being switchable between a first switch state and a second switch state, each switch state connecting the ADC:s 9, 10, 11, 12 to certain radar front end ports. A first radar front end port 13 is associated with the first four channels 101-104, a second radar front end port 14 is associated with the next four channels 105-108, a third radar front end port 15 is associated with the next four channels 109-112, and a fourth radar front end port 16 is associated with the last four channels 113-116.

More in detail, at the first switch state as shown with a solid line A indicating each switch, the first radar front end port 13 is connected to the third ADC 11; the second radar front 14 end port is connected to the fourth ADC 12; the third radar front end port 15 is connected to the first ADC 9; and the fourth radar front end port 16 is connected to the second ADC 10.

Furthermore, at the second switch state as shown with a dashed line B indicating each switch, the first radar front end port 13 is connected to the first ADC 9; the second radar front end port 14 is connected to the second ADC 10; the third radar front end port 15 is connected to the third ADC 11; and the fourth radar front end port 16 is connected to the fourth ADC 12.

The switches 22, 23, 24, 25 are controlled by the MCU 21, which is indicated by means of a dash-dotted connection C, schematically indicating the connection between the MCU 21 and the switches 22, 23, 24, 25.

In this way, at the first switch state A, the first eight channels 101-108 are connected to the second DSP 19 via the third ADC 11 and the fourth ADC 12, and the last eight channels 109-116 are connected to the first DSP 18 via the first ADC 9 and the second ADC 10. In the same way, at the second switch state B, the first eight channels 101-108 are connected to the first DSP 18 via the first ADC 9 and the second ADC 10, and the last eight channels 109-116 are connected to the second DSP 19 via the third ADC 11 and the fourth ADC 12.

By means of this arrangement, the diagnostic coverage of the system is increased, the two DSP:s 18 19 being used to form a time redundant system, where the switches 22, 23, 24, 25 are arranged to switch between the switch states above each passing time frame. The 4×4 analog channels 101-116 are thus switched to a different ADC and in combination to a different DSP each time frame.

Furthermore, each time frame, the MCU 21 is arranged to change which one of the DSP:s 18, 19 that is the Master DSP and which one that is the Slave DSP. The FFT is done for each sweep on both DSP:s 18, 19. For a certain time frame n, the present Master DSP performs a raw target calculation; the processed FFT data is always transferred from the temporary Slave DSP to the temporary Master DSP.

In the following, an example is shown for a certain time frame n and for the next time frame n+1.

Time Frame n
 Channel 101-104→third ADC 11→second DSP 19—temporary Master
 Channel 105-108→fourth ADC 12→second DSP 19—temporary Master
 Channel 109-112→first ADC 9→first DSP 18—temporary Slave
 Channel 113-116→second ADC 10→first DSP 18—temporary Slave Time Frame n+1
 Channel 101-104→first ADC 9→first DSP 18—temporary Master
 Channel 105-108→second ADC 10→first DSP 18—temporary Master
 Channel 109-112→third ADC 11→second DSP 19—temporary Slave
 Channel 113-116→fourth ADC 12→second DSP 19—temporary Slave With the change of the processing of the channels 101-116 for each time frame according to the above, a latent fault in one of the channels will lead to a false object or major distortion that changes its position for each time frame. This is detectable by the MCU 21, for example when processing the final target list and/or when performing calculation the time to collision.

This is a time redundant arrangement where hardware faults in the antennas, receiver system, signal conversion, FFT and pre-target calculation can be found. The periodically changes of the channels in the symmetric system generate the redundancy based on the time behavior over time, without adding redundant hardware, only the switches are added compared to previously known systems.

Since the number of radar front end ports and ADC:s may vary, the first example has a general form where the ADC:s are connected to a corresponding switch 22, 23, 24, 25 comprised in the vehicle radar system 3. The switches 22, 23, 24, 25 are switchable between a first switch state A and a second switch state B. At the first switch state A, the ADC:s 11, 12 connected to the second DSP 19 are also connected to a corresponding first set of radar front end ports 13, 14 via corresponding switches 24, 25, and the ADC:s 9, 10 connected to the first DSP 18 are also connected to a corresponding second set of radar front end ports 15, 16 via corresponding switches 22, 23. At the second switch state B, the ADC:s 11, 12 connected to the second DSP 19 are also connected to the second set of radar front end ports 15, 16 via the corresponding switches 24, 25, and the ADC:s 9, 10 connected to the first DSP 18 are also connected to the first set of radar front end ports 13, 14 via the corresponding switches 22, 23.

Figure 3:
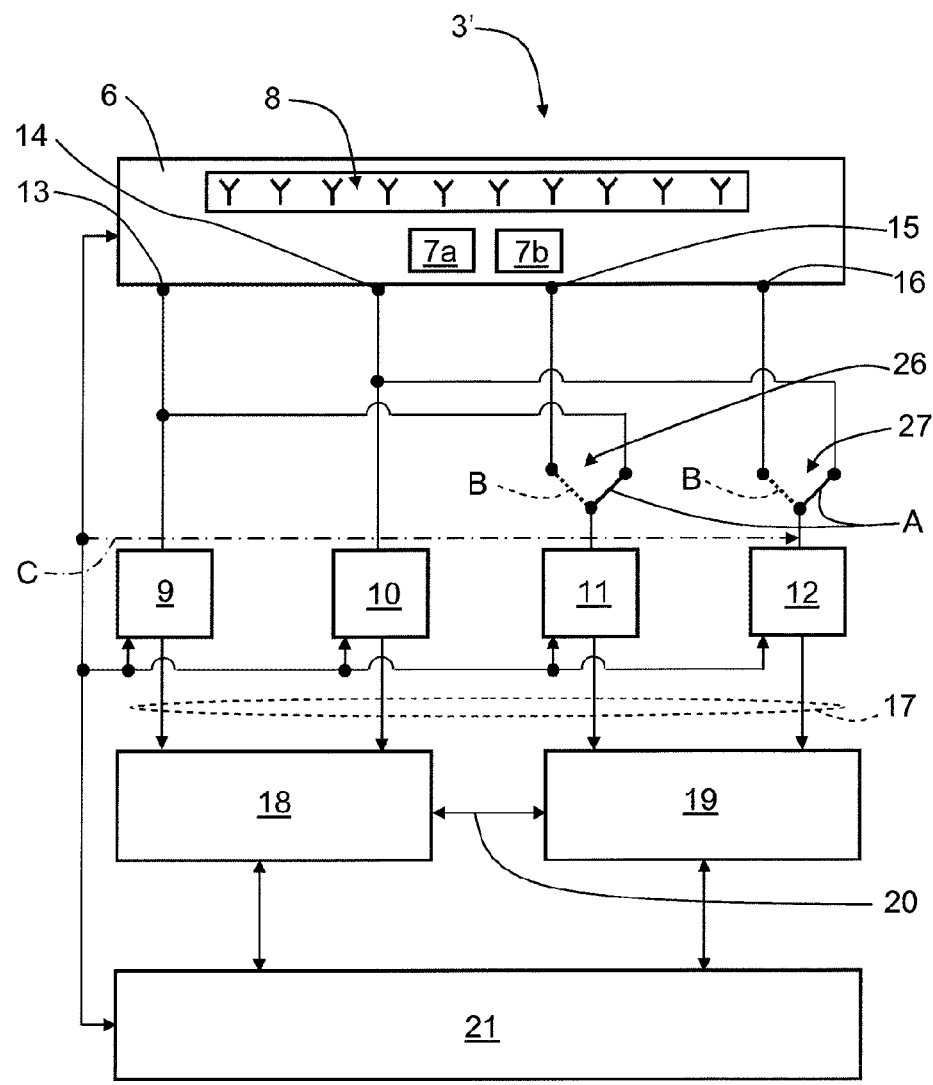
FIG. 3 shows a simplified schematic of a vehicle radar system according to a second example of the invention.

With reference to FIG. 3, showing a second example of a vehicle radar system 3' in accordance with this invention, the switches connected to the first ADC 9 and the second ADC 10 are removed; instead the first radar front end port 13 is connected to the first ADC 9 and the second radar front end port 14 is connected to the second ADC 10. The third ADC 11 is connected to a first switch 26 and the fourth ADC 12 is connected to a second switch 27. The switches 26, 27 are switchable between a first switch state and a second switch state, the first switch state being shown with a solid line A indicating each switch, and the second switch state being shown with a dashed line B indicating each switch. Otherwise the arrangement is identical to the one shown in FIG. 2.

At the first switch state A, the first ADC 9 and the third ADC 11 are connected to the first radar front end port 13, and the second ADC 10 and the fourth ADC 12 are connected to the second radar front end port 14. The third radar front end port 15 and the fourth radar front end port 16 are not connected.

At the second switch state B, the first radar front end port 13 is connected to the first ADC 9; the second radar front end port 14 is connected to the second ADC 10; the third radar front end port 15 is connected to the third ADC 11; and the fourth radar front end port 16 is connected to the fourth ADC 12.

In this way, at the first switch state A, the first eight channels 101-108 are connected to the first DSP 18 and the second DSP 19 simultaneously, via all the four ADC:s 9, 10, 11, 12. Channels 109-116 are not used. With identical input the FFT processing and preliminary target identification are conducted in the two DSP:s 18, 19, performing the identical DSP18 target list and DSP19 target list in parallel.

Furthermore, at the second switch state B, the first eight channels 101-108 are connected to the first DSP 18 via the first ADC 9 and the second ADC 10, and the last eight channels 109-116 are connected to the second DSP 19 via the third ADC 11 and the fourth ADC 12. This is the standard application case, i.e. normal running.

The MCU 21 is then arranged to activate the switch position A and receive the raw target list from DSP18 (Slave) and DSP19 (Master) for a dedicated "test" frame. The MCU21 compare the raw target lists from the DSPs. In case of differences, hardware faults are indicated. With this arrangement latent fault diagnosis is possible for the hardware on the elements ADC:s 9, 10, 11, 12 and the DSP:s 18, 19 and connections to and in between the elements.

In the following, an example is shown for a certain time frame n and for the next time frame n+1.

Time Frame n; Second Switch State B, Application Frame
 Channel 101-104→first ADC 9→first DSP 18—temporary Slave
 Channel 105-108→second ADC 10→first DSP 18—temporary Slave
 Channel 109-112→third ADC 11→second DSP 19—temporary Master
 Channel 113-116→fourth ADC 12→second DSP 19—temporary Master Time Frame n+1; First Switch State A, Test Frame
 Channel 101-104→first ADC 9→first DSP 18—temporary Master
 Channel 105-108→second ADC 10→first DSP 18—temporary Master Channel 101-104→third ADC 11→second DSP 19—temporary Slave Channel 105-108→fourth ADC 12→second DSP 19—temporary Slave A latent fault in the any one of the ADC:s 9, 10, 11, 12 and the DSP:s 18, 19 will be detected similarly as in the first example.

Since the number of radar front end ports and ADC:s may vary, the second example has a general form where the ADC:s 9, 10 connected to the first DSP 18 also are connected to a corresponding first set of radar front end ports 13, 14. Furthermore, the ADC:s 11, 12 connected to the second DSP 19 are also connected to corresponding switches 26, 27 comprised in the vehicle radar system 3'. The switches 26, 27 are switchable between a first switch state A and a second switch state B. At the first switch state A, the ADC:s 11, 12 connected to the second DSP 19 are also connected to the first set of radar front end ports 13, 14 via the switches 26, 27. At the second switch state B, the ADC:s 11, 12 connected to the second DSP 19 are also connected to a second set of corresponding radar front end ports 15, 16 via the switches 26, 27.

Figure 4:
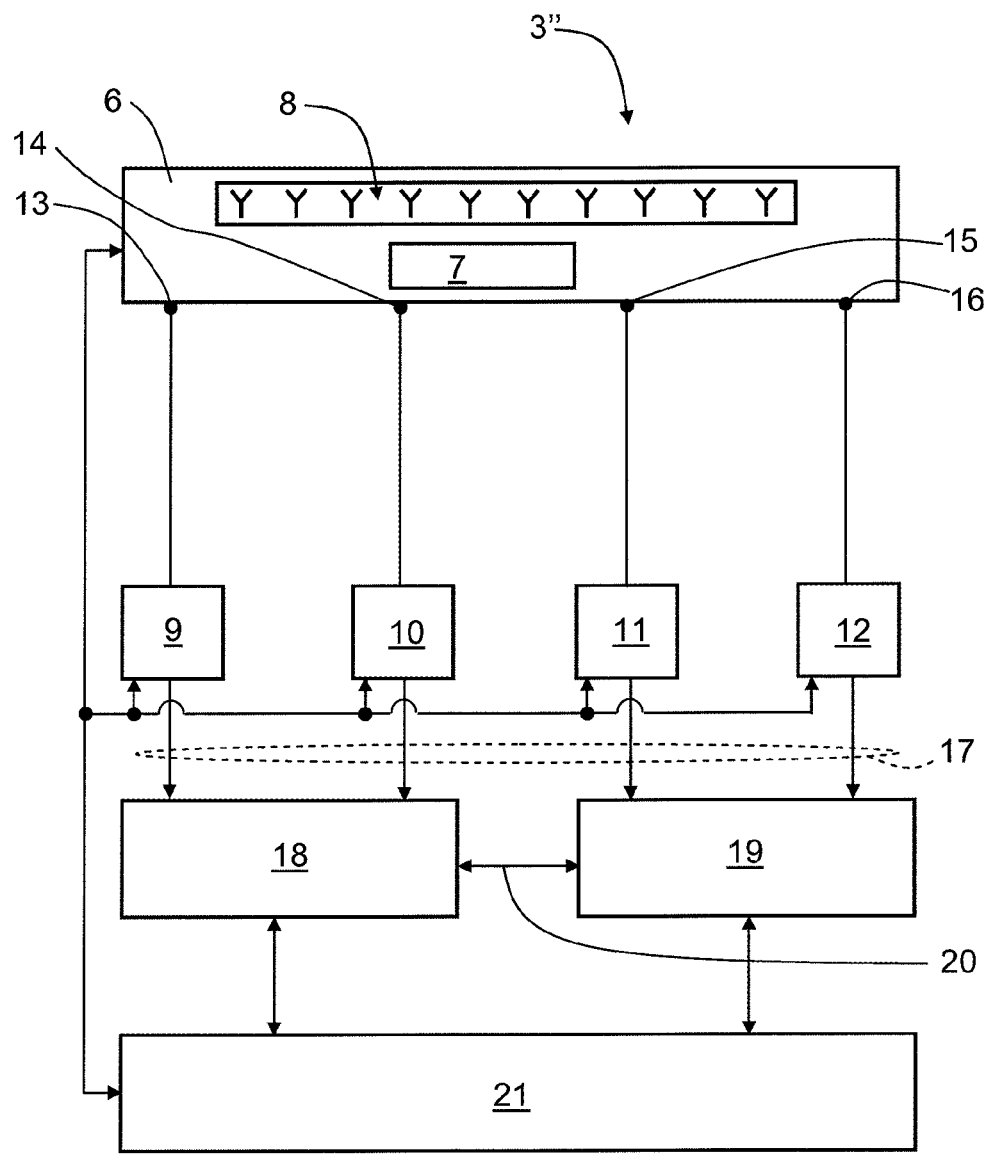
FIG. 4 shows a simplified schematic of a vehicle radar system according to a third example of the invention.

With reference to FIG. 4, showing a third example of a vehicle radar system 3" in accordance with this invention, all the switches are removed and the channels are connected to corresponding ADC:s 18, 19, otherwise the arrangement is identical to the one shown in FIG. 2. Here, the first radar front end port 13 is connected to the first ADC 9; the second radar front end port 14 is connected to the second ADC 10; the third radar front end port 15 is connected to the third ADC 11; and the fourth radar front end port 16 is connected to the fourth ADC 12. This means that the first eight channels 101-108 are connected to the first DSP 18 via the first ADC 9 and the second ADC 10, and the last eight channels 109-116 are connected to the second DSP 19 via the third ADC 11 and the fourth ADC 12.

In the arrangement according to the third example, the MCU 21 is arranged to change which one of the DSP:s 18, 19 that is the Master DSP and which one that is the Slave DSP. The FFT is done for each sweep/time frame on both DSP:s 18, 19, as in the previous example. By means of the arrangement according to the second example, the functionality of the DSP:s 18, 19 may be monitored. With this arrangement, that is less complicated than that of the previous examples, having dispensed with the switches, no diagnosis of the channels before the DSP:s 18 19 is possible, only a monitoring of both DSP:s 18, 19 is made possible.

The arrangement according to the second example is thus less extensive regarding system monitoring functionality, but does not need any additional monitoring hardware at all compared to previously known systems. All the inventive features of the third example are realized by means of software.

Figure 5:
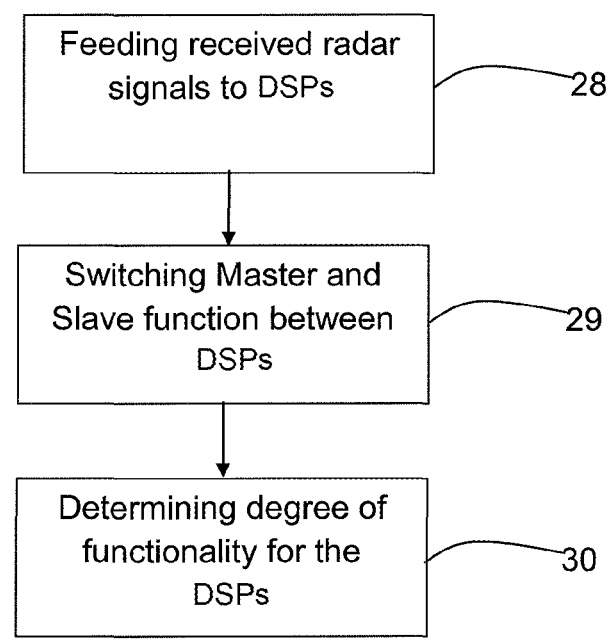
FIG. 5 shows a flowchart for a method according to the present invention.

With reference to FIG. 5, the present invention also relates to a method for monitoring functional parameters of a vehicle radar system, the method comprising the steps:

Step 28: sending radar signals and receiving reflected radar signals during certain time frames, the received radar signals being fed to a first Digital Signal Processor 18 (DSP) and a second DSP 19 (DSP) via analog to Digital Converters 9, 10, 11, 12 (ADC:s);

Step 29: controlling the DSP:s 18, 19 such that for one time frame n, the first DSP 18 is configured to be used as a Master DSP and the second DSP 19 is configured to be used as a Slave DSP, and such that for the next time frame n+1 the first DSP 18 is configured to be used as a Slave DSP and the second DSP 19 is configured to be used as a Master DSP, where, for a each time frame, the Slave DSP is used for pre-processing Fast Fourier Transform, FFT, data which is transferred to the Master DSP, which Master DSP is used for performing raw target calculation using the received pre-processed FFT data; and Step 30: comparing the raw target data from the first DSP 18 and from the second DSP 19 for determining a degree of functionality for the DSP:s 18, 19.

The present invention is not limited to the examples above. For example, the number of DSP:s and ADC: may vary, and the radar system general configuration may be of a different type than the one disclosed. The radar system may have different antennas for reception and transmission, and the radar system may be directed to indicate object at other directions that in front of the vehicle, for example at the back of the vehicle.

The radar system may be implemented in any type of vehicle such as cars, trucks and buses as well as boats and aircraft.

The schematics of vehicle radar systems are simplified, only showing parts that are considered relevant for an adequate description of the present invention. It is understood that the general design of radar systems of this kind is well-known in the art.

The number of radar front end ports may vary, as well as the number of channels dedicated to each port. There should be an even number of radar front end ports, and the number of radar front end ports should equal the number of ADC:s.

The ADC:s and DSP:s should each one be interpreted as having a corresponding ADC or DSP functionality, but do not necessarily have to be constituted by separate components. All ADC:s may be comprised in one ADC chip, and all DSP:s may be comprised in one DSP chip.

While the above description constitutes the preferred embodiment of the present invention, it will be appreciated that the invention is susceptible to modification, variation and change without departing from the proper scope and fair meaning of the accompanying claims.

The invention claimed is:

1. A vehicle radar system comprising:
   a radar front end having transmitting means configured to generate and transmit sweep signals, and receiving means configured to receive reflected signals a plurality of analog to digital converters, which are configured to convert the reflected signals to a digital signal form and to transfer the digital signals to a first digital signal processor and a second digital signal processor;
   a microcontroller unit configured to control the digital signal processors such that for a first time frame, the first digital signal processor is configured to function as a master digital signal processor and the second digital signal processor is configured to function as a slave digital signal processor;
   the microcontroller unit configured to control the digital signal processors such that for a second time frame, the first digital signal processor is configured to function as the slave digital signal processor and the second digital signal processor is configured to function as the master digital signal processor,
   where, for each of the first and second time frames, the slave digital signal processor is configured to pre-process fast Fourier transform data and to transfer the pre-processed fast Fourier transform data to the master digital signal processor, which master digital signal processor is configured to perform raw target calculations by means of received pre-processed fast Fourier transform data; and where the microcontroller unit is configured to compare the raw target data from the first digital signal processor and from the second digital signal processor and to, based on such comparisons, determine when a fault exists.

2. The vehicle radar system according to claim 1, wherein that the radar front end further comprises an even number of radar front end ports, equaling the number of analog to digital converters, where a number of radar signal channels is dedicated to each radar front end port, the number of analog to digital converters being connected to the first digital signal processor equaling the number of analog digital converters being connected to the second digital signal processor.

3. The vehicle radar system according to claim 1:
wherein the analog to digital converters connected to the first digital signal processor are connected to a corresponding first set of the radar front end ports, and the analog to digital converters connected to the second digital signal processor are connected to corresponding switches comprised in the vehicle radar system;
the switches being switchable between a first switch state and a second switch state, where at the first switch state;
the analog to digital converters connected to the second digital signal processor are connected to the first set of radar front end ports via the switches; and
where at the second switch state, the analog to digital converters connected to the second digital signal processor are connected to a second set of corresponding radar front end ports via the switches.

4. A vehicle radar system according to claim 1, further comprising:
wherein the analog to digital converters are connected to a corresponding switch comprised in the vehicle radar system, the switches being switchable between a first switch state and a second switch state, where at the first switch state, the analog to digital converters connected to the second digital signal processor are connected to a corresponding first set of radar front end ports via corresponding switches; and
the analog to digital converters connected to the first digital signal processor are connected to a corresponding second set of radar front end ports via corresponding switches, and where at the second switch state, the analog to digital converters connected to the second digital signal processor are connected to the second set of radar front end ports via the corresponding switches, and the analog to digital converters connected to the first digital signal processor are connected to the first set of radar front end ports via the corresponding switches.

5. A method for monitoring functional parameters of a vehicle radar system, the method comprising the steps of:
sending radar signals and receiving reflected radar signals during certain time frames, the received radar signals being fed to a first digital signal processor, and a second digital processor via a plurality of analog to digital converters;
controlling the digital signal processors wherein during a first time frame, the first digital signal processor is configured to be used as a master digital signal processor and the second digital signal processor is configured to be used as a slave digital signal processor, and such that for
controlling the digital signal processors wherein during a second time frame, the first digital signal processor is configured to be used as the slave digital signal processor and the second digital signal processor is configured to be used as the master digital signal processor;
where, for both the first and second time frames, the slave digital signal processor is used for pre-processing, fast Fourier transform data which is transferred to the master digital signal processor, which master digital signal processor is used for performing raw target calculation using received pre-processed fast fourier transform data; and
comparing the raw target data from the first digital signal processor and from the second digital signal processor for determining when a fault exists.

6. The method according to claim 5, further comprising:
wherein the analog to digital converters connected to the first digital signal processor are connected to a corresponding first set of radar front end ports; and
where the method comprises the step of switching the analog to digital converters connected to the second between a first switch state and a second switch state, where at the first switch state, the analog to digital converters connected to the second digital signal processor are connected to the first set of radar front end ports, and where at the second switch state the analog to digital converters connected to the second digital signal processor are connected to a second set of corresponding radar front end ports.

7. The method according to claim 5, further comprises the step of switching the analog to digital converters between a first switch state and a second switch state, where at the first switch state, the analog to digital converters connected to the second digital signal processor are connected to a corresponding first set of radar front end ports, and the analog to digital converters connected to the first digital signal processor are connected to a corresponding second set of radar front end ports, and where at the second switch state, the analog to digital converters connected to the second digital signal processor are connected to the second set of radar front end ports, and the analog to digital converters connected to the first digital signal processor are connected to the first set of radar front end ports.

* * * * *